(12) United States Patent
Hayashikawa et al.

(10) Patent No.: US 7,580,439 B2
(45) Date of Patent: Aug. 25, 2009

(54) GAS LASER OSCILLATOR

(75) Inventors: Hiroyuki Hayashikawa, Osaka (JP); Hitoshi Hongu, Hyogo (JP); Atsuki Yamamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 76 days.

(21) Appl. No.: 10/576,688

(22) PCT Filed: Sep. 20, 2005

(86) PCT No.: PCT/JP2005/017246

§ 371 (c)(1),
(2), (4) Date: Apr. 21, 2006

(87) PCT Pub. No.: WO2006/038451

PCT Pub. Date: Apr. 13, 2006

(65) Prior Publication Data

US 2007/0091969 A1   Apr. 26, 2007

(30) Foreign Application Priority Data

Oct. 7, 2004   (JP) .............................. 2004-294801

(51) Int. Cl.
   *H01S 3/22* (2006.01)
(52) U.S. Cl. ............... 372/59; 372/58; 372/55
(58) Field of Classification Search .......... 372/58, 372/59, 55
   See application file for complete search history.

(56) References Cited

U.S. PATENT DOCUMENTS

| | | | | |
|---|---|---|---|---|
| 4,935,937 A | | 6/1990 | Yamazaki et al. | |
| 4,956,846 A | * | 9/1990 | Iehisa | 372/58 |
| 5,966,398 A | * | 10/1999 | Karube et al. | 372/58 |
| 6,067,498 A | * | 5/2000 | Akiyama | 701/110 |
| 2006/0052930 A1 | * | 3/2006 | Froloff et al. | 701/103 |

FOREIGN PATENT DOCUMENTS

| | | | |
|---|---|---|---|
| JP | 02177582 A | * | 7/1990 |
| JP | 09-266342 | | 10/1997 |
| JP | 11-145531 | | 5/1999 |
| JP | 2000-022243 | | 1/2000 |
| JP | 2000-357830 | | 12/2000 |
| JP | 2003-110170 | | 4/2003 |

* cited by examiner

*Primary Examiner*—Minsun Harvey
*Assistant Examiner*—Kinam Park
(74) *Attorney, Agent, or Firm*—McDermott Will & Emery LLP

(57) ABSTRACT

A gas laser oscillator appropriately detecting a clogging of a laying pipe of a sub ejection apparatus is disclosed. The gas laser oscillator according to the present invention includes a laser gas flow pipe, a driving part, a divide wall, a main ejection apparatus, a sub ejection apparatus, a detect portion, and a clogged laying pipe judge part. The laser gas flow pipe constitutes a circulating route of the laser gas. The driving part drives the air blower for blowing the laser gas. The divide wall separates the air blower and the driving part. The main ejection apparatus has a valve, and ejects laser gas from the laser gas flow pipe. The sub ejection apparatus ejects laser gas from the driving part. The detector detects an amount of laser gas ejected from the main ejection apparatus and the sub ejection apparatus. The clogged laying pipe judge part judges that the laying pipe of the sub ejection apparatus is clogged when an amount of ejected laser gas measured at a time the valve of the main ejection apparatus is closed is lower than a predetermined value.

3 Claims, 6 Drawing Sheets

GAS LASER OSCILLATOR

This application is the U.S. National Phase under 35 U.S.C. § 371 of International Application No. PCT/JP2005/017246, filed Sep. 20, 2005, which in turn claims the benefit of Japanese Application No. 2004-294801, filed Oct. 7, 2004, the disclosures of which Applications are incorporated by reference herein in their entirety.

TECHNICAL FIELD

This invention relates to a gas laser oscillator incorporating an air blower for circulating laser gas.

BACKGROUND ART

FIG. 5 shows a structural outline of a conventional axis flow type gas laser oscillator. The conventional axis flow type gas laser oscillator is explained hereinafter by referring to FIG. 5.

In FIG. 5, discharge tube 1 is made of dielectric material such as glass. Electrodes 2 and 3 are placed at circumference of discharge tube 1. Power source 4 is connected to electrodes 2 and 3. Discharge space 5 is an empty space allocated between electrodes 2 and 3 inside discharge tube 1. Discharge part 40 includes discharge tube 1, electrodes 2 and 3, power source 4, and discharge space 5. Fully reflective mirror 6 and partially reflective mirror 7 are placed at both ends of discharge space 5, constituting the optical oscillator. Laser beam 8 is issued from partially reflective mirror 7. Arrow mark 9 indicates a direction of laser gas flow circulating in the gas laser oscillator. Laser gas flow pipe 10 indicates a flow route of laser gas. Heat exchangers 11 and 12 reduce a temperature of the laser gas heated by an electric discharge in discharge space 5 and a movement of an air blower. Air blower 13 circulates laser gas in discharge space 5 at a flow speed of about 100 m/sec. Laser gas flow pipe 10 and discharge tube 11 are connected at laser gas introduce part 14.

Following, working mechanism of the conventional gas laser oscillator is explained.

Laser gas introduce part 14 introduces laser gas blown by air blower 13 into discharge tube 1 through laser gas flow pipe 10. The electrodes 2 and 3 connected to power source 4 discharge electricity in discharge space 5. Laser gas is excited in discharge space 5 by receiving the discharged electric energy. The excited laser gas becomes an oscillating state in the optical oscillator composed of fully reflective mirror 6 and partially reflective mirror 7, emitting laser beam 8 from partially reflective mirror 7. Thus produced laser beam 8 is used for laser processing.

FIG. 6 is a structural diagram of the conventional gas laser oscillator illustrated with an air blower and its vicinity. Air blower 13 is fixed to driving part 22 via shaft 23. Air blower 13 and driving part 22 are separated by divide wall 24. A several ten μm of space is made around shaft 23 for not obstructing rotation of the shaft.

With this kind of conventional gas laser oscillator, the gas is dissociated by the electric discharge so is deteriorated with an elapse of time. Because of this reason, the laser gas is partially ejected from gas flow pipe 10 at any time by main ejection apparatus 25.

Driving part 22 contains oil 33 for lubricating the driving part. If mist of the oil (hereafter called 'mist') is dispersed into the laser gas in the gas circulating part, purity of the gas is lowered causing a serious malfunction during laser oscillation. To prevent the oil mist to move into air blower 13 through divide wall 24, a pressure in driving part 22 needs to be lower than that of in air blower 13 at any time.

Gas supply apparatus 29 is connected to laser gas flow pipe 10 for supplying an equivalent amount of ejected laser gas. Sub ejection apparatus 26 ejects laser gas from driving part 22. Namely, the conventional gas laser oscillator has two ejecting apparatus, main ejection apparatus 25 and sub ejection apparatus 26, and both gas ejecting apparatus are connected to vacuum pump 27.

As described, with the conventional gas laser oscillator, the laser gas is drawn out of driving part 22 and a pressure inside driving part 22 is made lower than where air blower 13 is, and such state is identified. A constitution of above mentioned conventional gas laser oscillator is disclosed in Japanese Patent Unexamined Publication No. 2000-22243 and No. 2003-110170, for examples.

In the conventional gas laser oscillator, however, sub ejection apparatus 26 draws gas what is mixed with oil mist from driving part 22, so that liquefied oil is deposited inside the laying pipe and then is solidified, clogging the pipe with an elapse of time. The clogged pipe reduces an amount of gas ejected through sub ejection apparatus 26, causing an insufficient ejection of gas from driving part 22. Consequently, a difference in pressure between driving part 22 and air blower 13 becomes smaller, increasing a possibility of oil mist in driving part 22 entering into air blower 13. The laying pipe of the sub ejection apparatus clogged with a lapse of time can be cleaned easily as long as a proper maintenance work is conducted, so how fast to detect a clogging of the pipe is a possible problem.

SUMMARY OF THE INVENTION

The invention provides a gas laser oscillator which appropriately detects a clogged of a laying pipe of a sub ejection apparatus.

The gas laser oscillator according to the present invention includes a discharge part, an air blower, a laser gas flow pipe, a driving part, a divide wall, a gas supply apparatus, a main ejection apparatus, the sub ejection apparatus, a detector, a controller (it can be referred to as a gas pressure controller), and a clogged laying pipe judge part. The discharge part is composed of a discharge tube, electrodes, a power source and a discharge space for exciting laser gas. The air blower blows the laser gas. The laser gas flow pipe constitutes a circulation route of the laser gas between the discharge part and the air blower. The driving part drives the air blower. The divide wall separates the air blower part and a driving part. The gas supply apparatus has a valve, for supplying the laser gas to the laser gas flow pipe.

The main ejection apparatus has a valve, ejecting laser gas from the laser gas flow pipe. The sub ejection apparatus ejects the laser gas from the driving part. The detector detects an amount of the laser gas ejected from at least one of the main ejection apparatus and the sub ejection apparatus. The controller controls each valve of the gas supply apparatus and the main ejection apparatus. A signal from the detector is input to the controller, and the controller compares the ejected amount of the laser gas at a time the valve of the main apparatus is closed, with a predetermined value. The clogged laying pipe judge part judges the laying pipe of the sub ejection apparatus is clogged when an ejected amount of the laser gas is smaller than a predetermined value. A signal from the detector is input to the controller and then the controller compares the ejected amount of the laser gas at the time the valve of the main ejection apparatus is closed with a predetermined value.

As described, clogging of the laying pipe of the sub ejection apparatus can be appropriately identified by detecting the ejected amount of the laser gas at the time the valve of the main ejection apparatus is closed and the detected amount is compared with a predetermined value. Thus, a gas laser oscillator is provided, which is highly reliable and which can be used stably for a long period of time.

The gas laser oscillator according to the invention may further include an opening and closing cycle detector detecting an opening and closing cycle of the valves of the gas supply apparatus. The clogged laying pipe judge part can judge the laying pipe of the sub ejection pipe is clogged when the opening and closing cycle at a time the valve of the main ejection apparatus is closed is longer than a predetermined value. With this arrangement, a change of the opening and closing cycle of the valve of the gas supply apparatus at the time the valve of the main ejection apparatus is closed is detected and compared with a predetermined value, detecting clogging of the sub ejection apparatus. Thus, a gas laser oscillator which is highly reliable and is stably usable for a long period of time can be provided.

Furthermore, the gas laser oscillator of this invention may include an alarm part generating an alarm when the clogged laying pipe judge part detects clogged of the laying pipe. With this arrangement, clogged laying pipe can be quickly detected.

Figure 1:
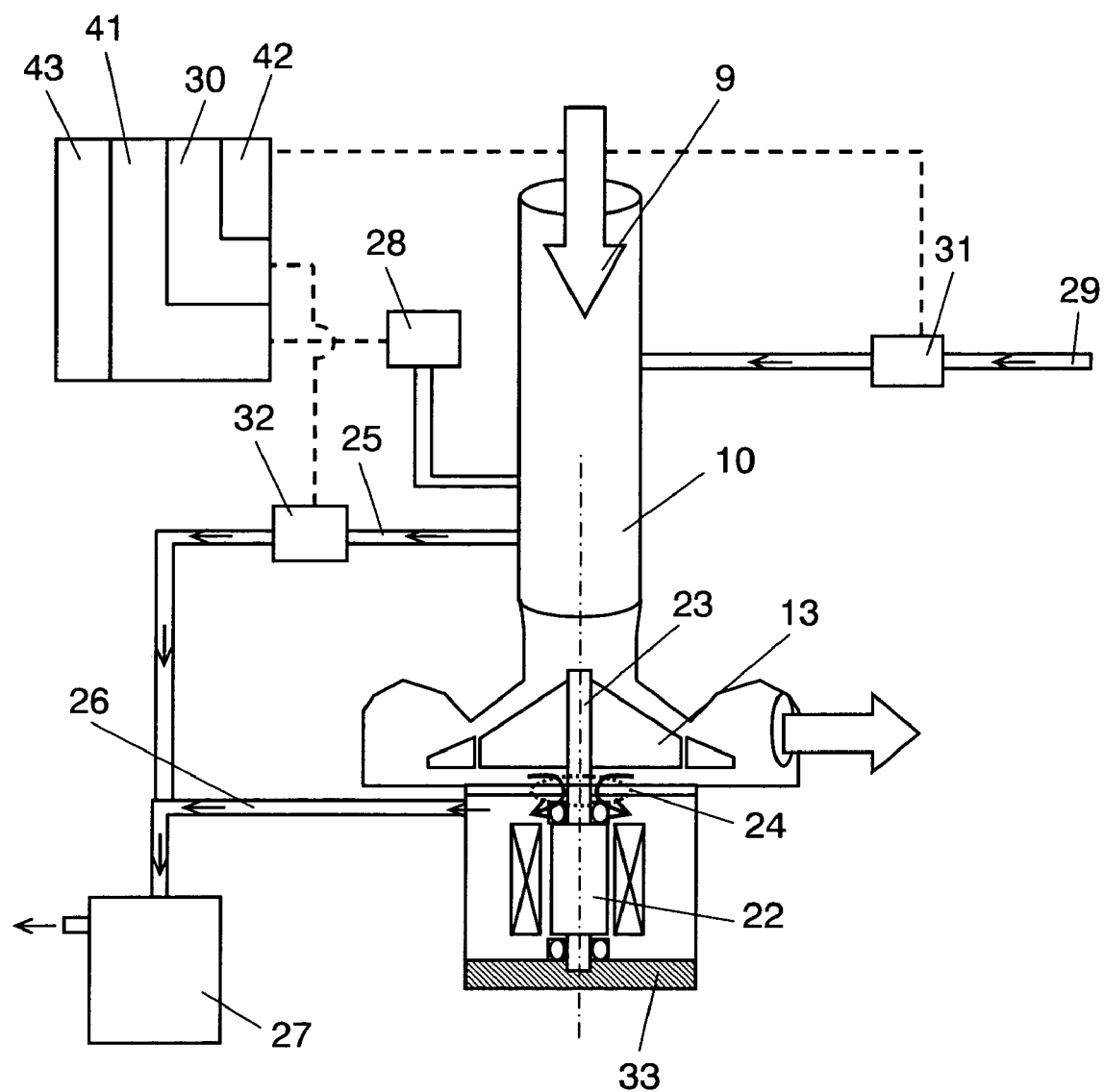
FIG. 1 is a structural diagram of a main part of a gas laser oscillator according to an exemplary embodiment of the present invention.

REFERENCE MARKS IN THE DRAWINGS 1 discharge tube
2, 3. electrode
4 power source
5 discharge space
6 fully reflective mirror
7 partially reflective mirror
8 laser beam
9 flowing direction of laser gas
10 laser gas flow pipe
11, 12 heat exchanger
13 air blower
14 laser gas introduce part
22 driving part
23 shaft
24 divide wall
25 main ejection apparatus
26 sub ejection apparatus
27 vacuum pump
28 gas pressure sensor
29 gas supply apparatus
30 controller (gas pressure controller)
31 supply valve
32 ejection valve
33 oil
34 flow amount sensor
35 pressure detect port
40 discharge part
41 clogged laying pipe judge part
42 opening and closing cycle detector
43 alarm part

DETAILED DESCRIPTION OF PREFERRED EMBODIMENT

A gas laser oscillator according to exemplary embodiments of the present invention is explained hereinafter using the drawings.

Figure 5:
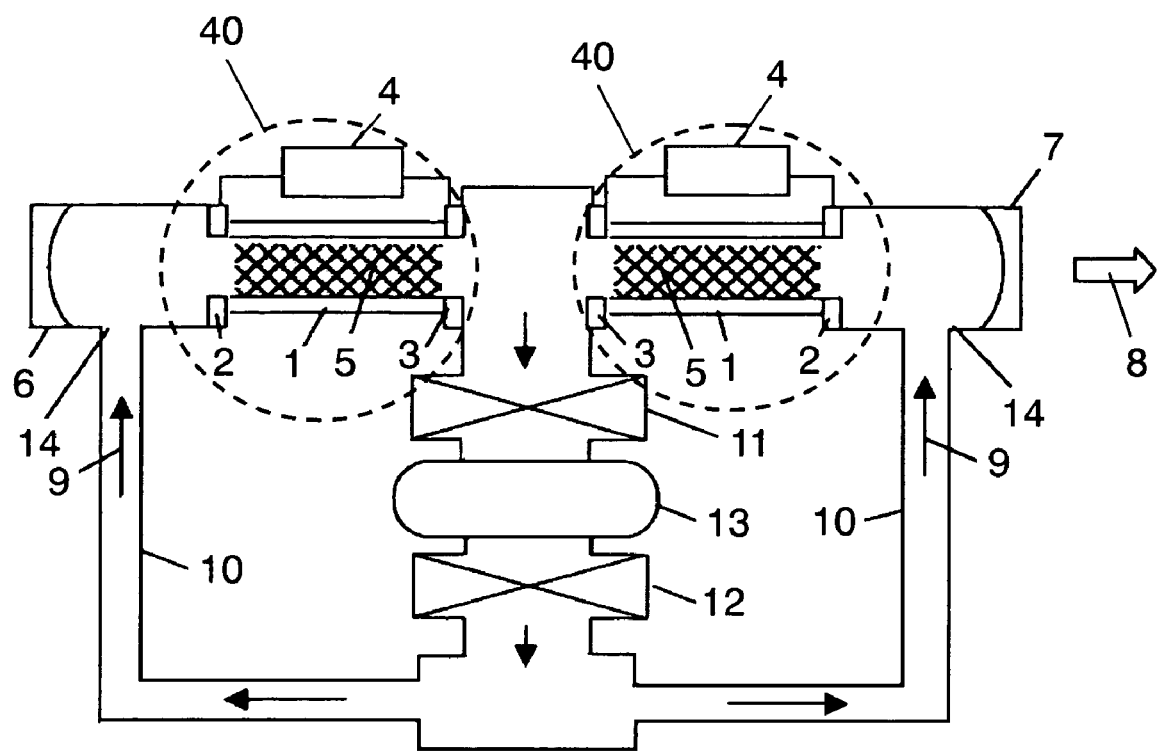
FIG. 5 is a structural diagram of a conventional gas laser oscillator.
Figure 6:
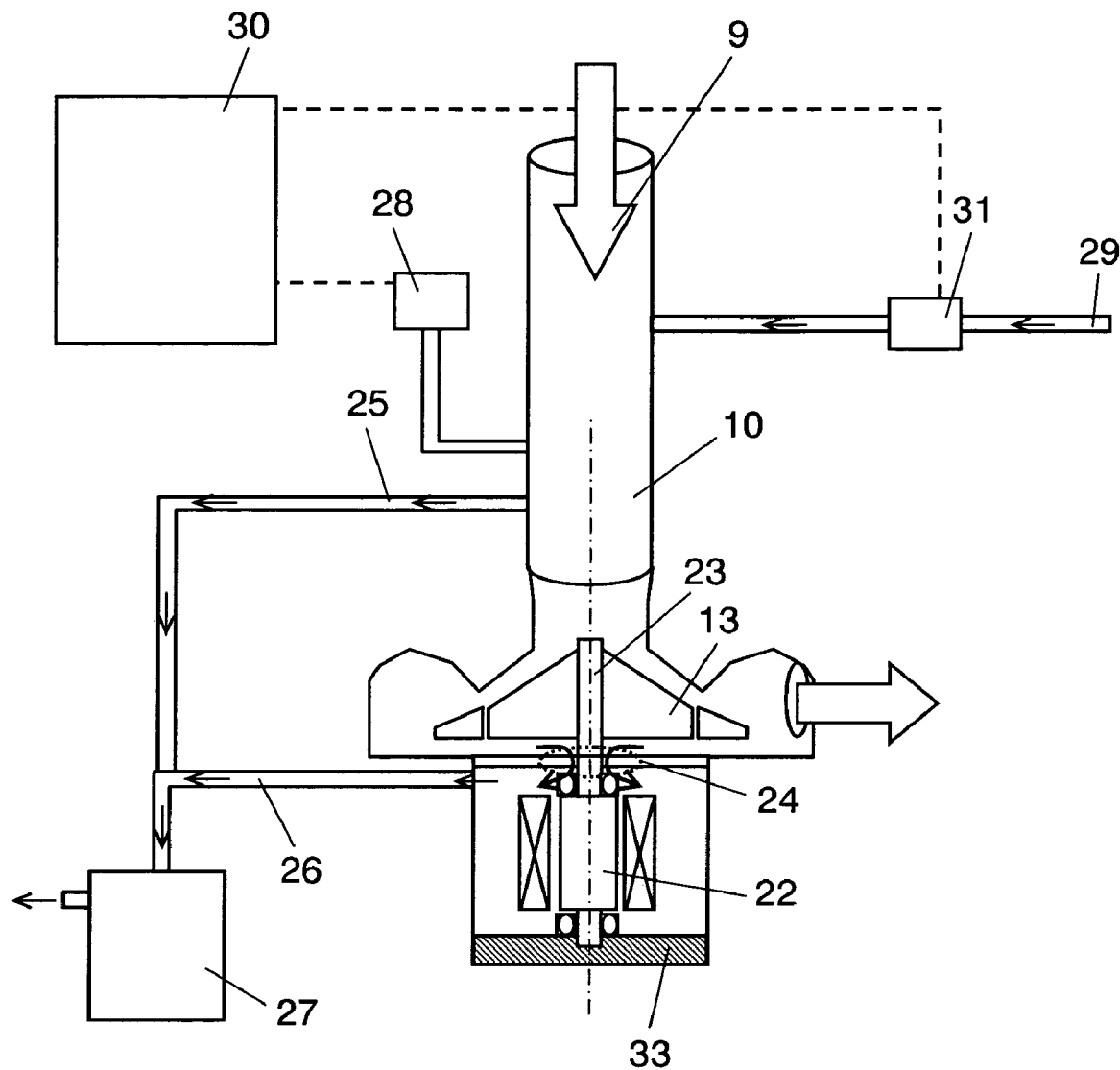
FIG. 6 is a structural diagram of a main part of the conventional gas laser oscillator.

A basic constitution of the gas laser oscillator according to the exemplary embodiments is the same as that of the laser oscillator illustrated in FIGS. 5 and 6, so same reference numerals as for FIGS. 5 and 6 are used as long as constitution is identical, and detail explanation of the numerals is omitted. Following, unique features of the exemplary embodiments are explained.

FIG. 1 is a constitutional drawing illustrating a main part of a laser oscillator according to an exemplary embodiment of the invention. Gas pressure in a laser gas flow pipe is always monitored by gas pressure sensor 28, a detect portion. Gas pressure sensor 28 and gas supply apparatus 29 are connected to gas pressure controller 30. Gas pressure controller 30 controls gas supply apparatus 29 so that gas supply apparatus 29 continues supplying fresh laser gas from outside into the flow pipe, supplementing an amount of gas ejected by two ejecting apparatus, thereby always keeping the gas pressure in the laser gas flow pipe constant.

Gas supply apparatus 29 ordinarily incorporates valve 31. When a gas pressure in the laser gas flow pipe is decreased below a certain level, gas pressure controller 30 opens valve 31 introducing gas into the laser gas flow pipe. When the gas pressure inside the laser gas flow pipe is increased with the supplied gas above a certain level, gas pressure controller 30 closes gas supply valve 31. Laser gas ejecting mechanism in main ejection apparatus 25 incorporates ejection valve 32. Ejection valve 32 is usually opened for passing a certain amount of laser gas.

Vacuum pump 27 is constantly draining gas, for instance about 10 liter (hereafter called L)/hour, in a ratio of about 9 L/hour from main ejection apparatus 25 and about 1 L/hour from sub ejection apparatus 26. A diameter of a flow pipe of the sub ejection apparatus is made smaller than that of the main ejection apparatus, causing a difference in flow resistance thereby a difference in an amount of gas to be ejected. As the gas is ejected by vacuum pump 27, a pressure in laser gas flow pipe 10 is accordingly reduced. Gas pressure sensor 28 always monitors a change in the gas pressure, supplementing a decreased amount of gas by opening and closing supply valve 31.

Supply valve 31 works as follows. When a gas pressure in laser gas flow pipe 10 falls below a certain level, for instance below 20.0 k pascal (hereinafter kPa), gas pressure controller 30 sends a signal to supply valve 31 for opening the valve and starting supply of gas. When the gas is supplied, the pressure in laser gas flow pipe 10 is raised up to a certain level, for instance 21.0 kPa in about 0.5 second, and then supply valve 31 is closed. Despite the opening and closing of supply valve 31, gas is constantly discharged by vacuum pump 27.

When supply valve 31 is closed, the pressure inside laser gas flow pipe 10 is gradually decreased from 21.0 kPa down to 20.0 kPa in about 19 to 20 seconds. When the pressure is decreased down to 20.0 kPa, supply valve 31 opens again. Consequently, a repetition of this cycle that is the opening and closing cycle of supply valve 31 becomes about 20 seconds. If, by any reason, an amount of gas ejected by vacuum pump 27 is decreased, a reduction rate of gas pressure in the laser gas flow pipe per a unit period of time is reduced, thereby the opening and closing cycle of supply valve 31 becomes longer.

For example, if the amount of the gas ejected by vacuum pump 27 is changed from an ordinary amount of about 10 L/hour to about 5 L/hour, the opening and closing cycle of supply valve 31 is correspondingly prolonged from an ordinary 20 seconds to about 40 seconds. That means, as long as opening and closing detect portion 42 keeps monitoring the opening and closing cycle of supply valve 31, an amount of escaping gas from vacuum pump 27 can be indirectly monitored. Opening and closing cycle detector 42 for monitoring the opening and closing cycle of supply valve 31 is installed next to gas pressure controller 30 for instance.

Sub ejection apparatus 26 can be clogged with oil mist with an elapse of time. In this case, an amount of gas ejected by sub ejection apparatus 26 becomes significantly smaller than an amount ejected by main ejection apparatus 25, so even if sub ejection apparatus 26 is clogged decreasing an amount of ejection, a corresponding amount of gas is ejected through main ejection apparatus 25, not significantly changing a total amount of gas going out from vacuum pump 27 from 10 L/hour. Because of this reason, even if an amount of gas ejected from vacuum pump 27 is directly monitored, or indirectly monitored using already mentioned opening and closing cycle of supply valve 31, detecting a change in an amount of ejected gas caused by clogged sub ejection apparatus 26 may be difficult. Even if a threshold is setup, a malfunction may be generated, hence this method is not practical.

A point of this invention is in ejection valve 32 installed in main ejection apparatus 25. In an ordinary state where an air blower is blowing and a laser oscillator is oscillating, ejection valve 32 is opened. However, if valve 32 is closed for a certain period of time while the oscillator is in motion, vacuum pump 27 drains gas ejected only through sub ejection apparatus 26. When sub ejection apparatus 26 is not clogged by oil mist or the like, ejected amount of gas from vacuum pump 27 does not practically change from 10 L/hour. This is because a gas pressure is naturally balanced so as the gas which is otherwise ejected through main ejection apparatus 25 is ejected through sub ejection apparatus 26. On the other hand, when sub ejection apparatus 26 is almost entirely clogged by oil mist or the like, closing of ejection valve 32 greatly reduces an amount of gas drained by vacuum pump 27 from the initial state of 10 L/hour down to 1-2 L/hour for instance.

Thus, clogged laying pipe judge part 41 can monitor the amount of gas decreased by vacuum pump 27 when ejection valve 32 is opened and closed. By comparing both of the amounts, or by comparing the amount with a predetermined value, the judge part can detect clogging status of sub ejection apparatus 26. When abnormality is found, alarm part 43 disposed beside such as clogged laying pipe judge part 41 generates an alarm urging a user to clean inside sub ejection apparatus 26. Thus, invasion of oil mist originated from oil 32 in driving part 22 into laser gas flow pipe 10 can be prevented.

An idea of abolishing main ejection apparatus 25 and ejecting laser gas only through sub ejection apparatus 26 has been evaluated. In this case, a pressure difference between air blower 13 and driving part 22 may be kept above a certain level at any time, effectively stopping invasion of oil mist into laser gas flow pipe 10. However, it may be difficult to continue ejecting dissociated laser gas in a rate of about 10 L/hour, which is supposed to be a primary function of main ejection apparatus 25. Because sub ejection apparatus 26 forms a laser gas flow through divide wall 24 having as narrow as 10 μm of passage, achieving a gas flow in an order as much of 10 L/hour may be difficult.

In this invention, several minutes of closing period of ejection valve 32 is enough for detecting a clogging status of sub ejection apparatus 26, during the period judge part 41 can identify the clogging. In an ordinary operation, by conducting above mentioned detecting sequence once every several hours, the clogging of sub ejection apparatus 26 can be identified. If ejection valve 32 is closed for a longer period of time (over several tens minutes), insufficient ejection of dissociated laser gas may cause a secondary problem such as lowering a laser issuing power, however, several minutes of closing period does not cause such a problem.

The above judging sequence can be applied to an other state than when the air blower is working. During a period after an operation is finished and before a next operation is started, impurities educed inside the gas flow pipe and moisture invaded from outside can be mixed with laser gas. The gas laser oscillator usually ejects such impure laser gas from the gas flow pipe by a vacuum pump before starting operating—which is called 'evacuation', and then introduces fresh laser gas from a gas cylinder. The evacuation is usually made through both the main ejection apparatus and the sub ejection apparatus. During the evacuation process, ejection valve 32 is momentarily closed, and then declining ejection speed is quantified; namely a period of time needed to lower a certain amount of pressure is measured. The obtained figure is compared with a predetermined value; therewith a similar detection becomes possible.

Figure 2:
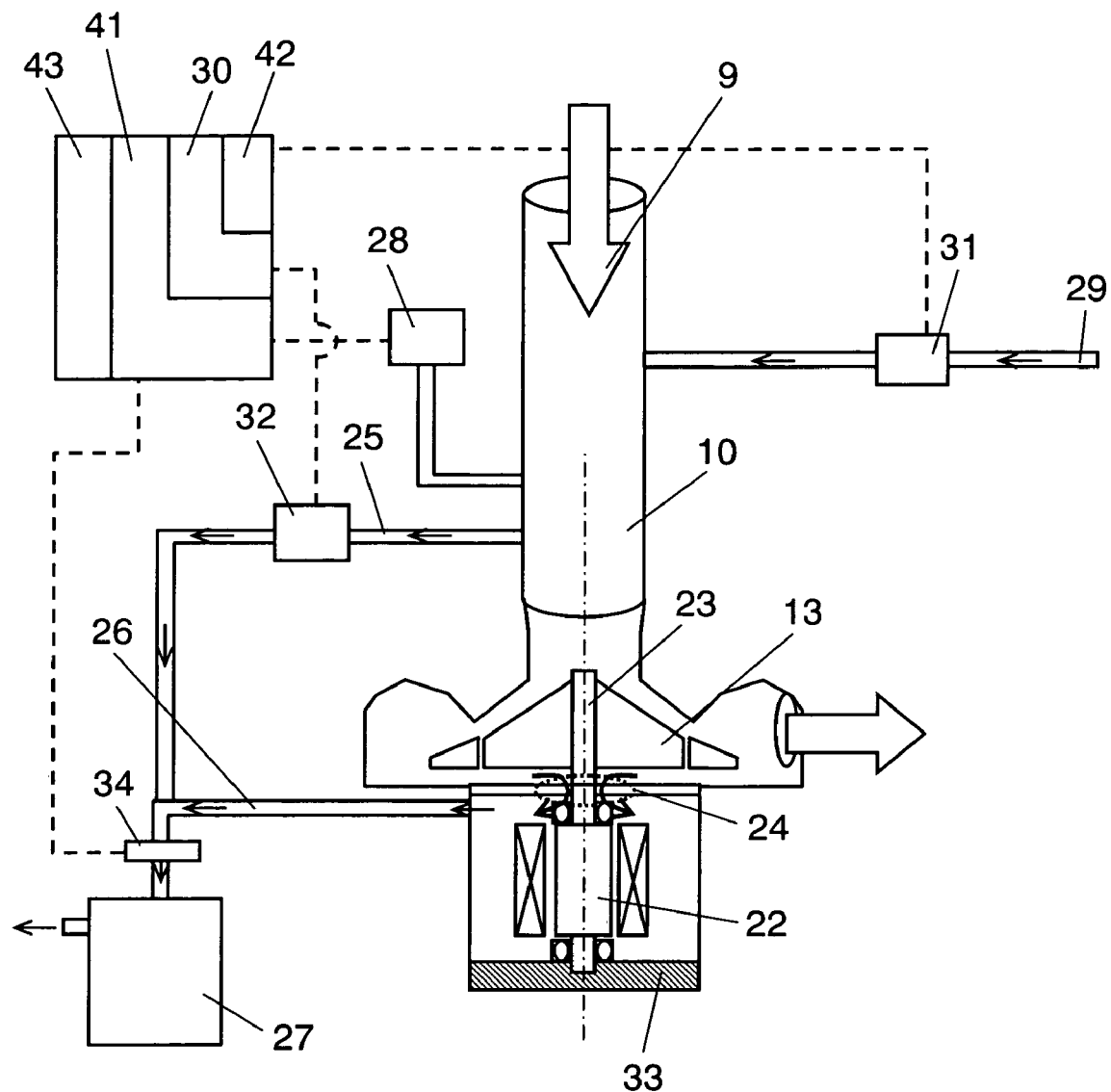
FIG. 2 is a structural diagram of a main part of a gas laser oscillator according to other exemplary embodiment of the present invention.
Figure 3:
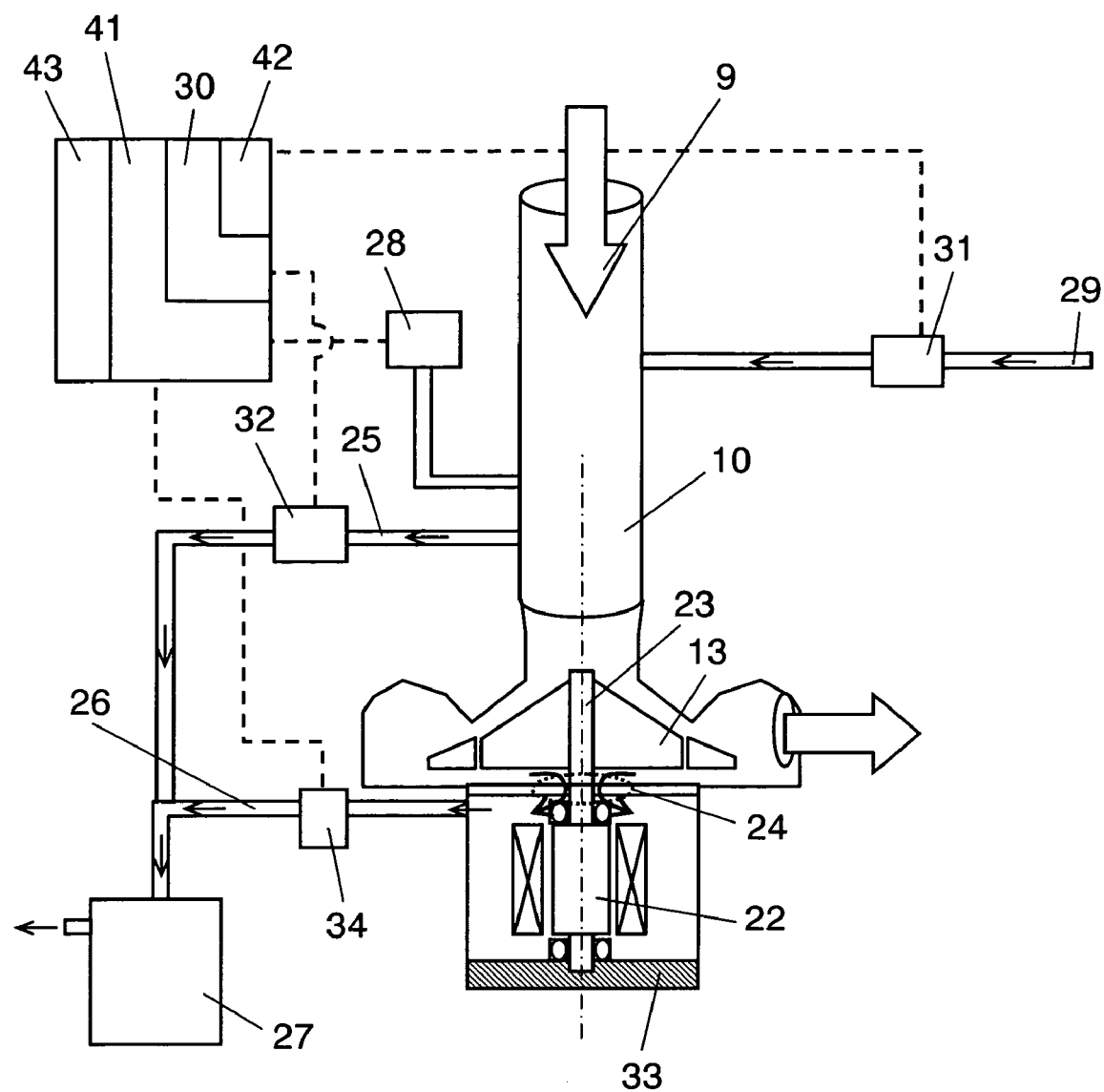
FIG. 3 is a structural diagram of a main part of a gas laser oscillator according to still other exemplary embodiment of the present invention.
Figure 4:
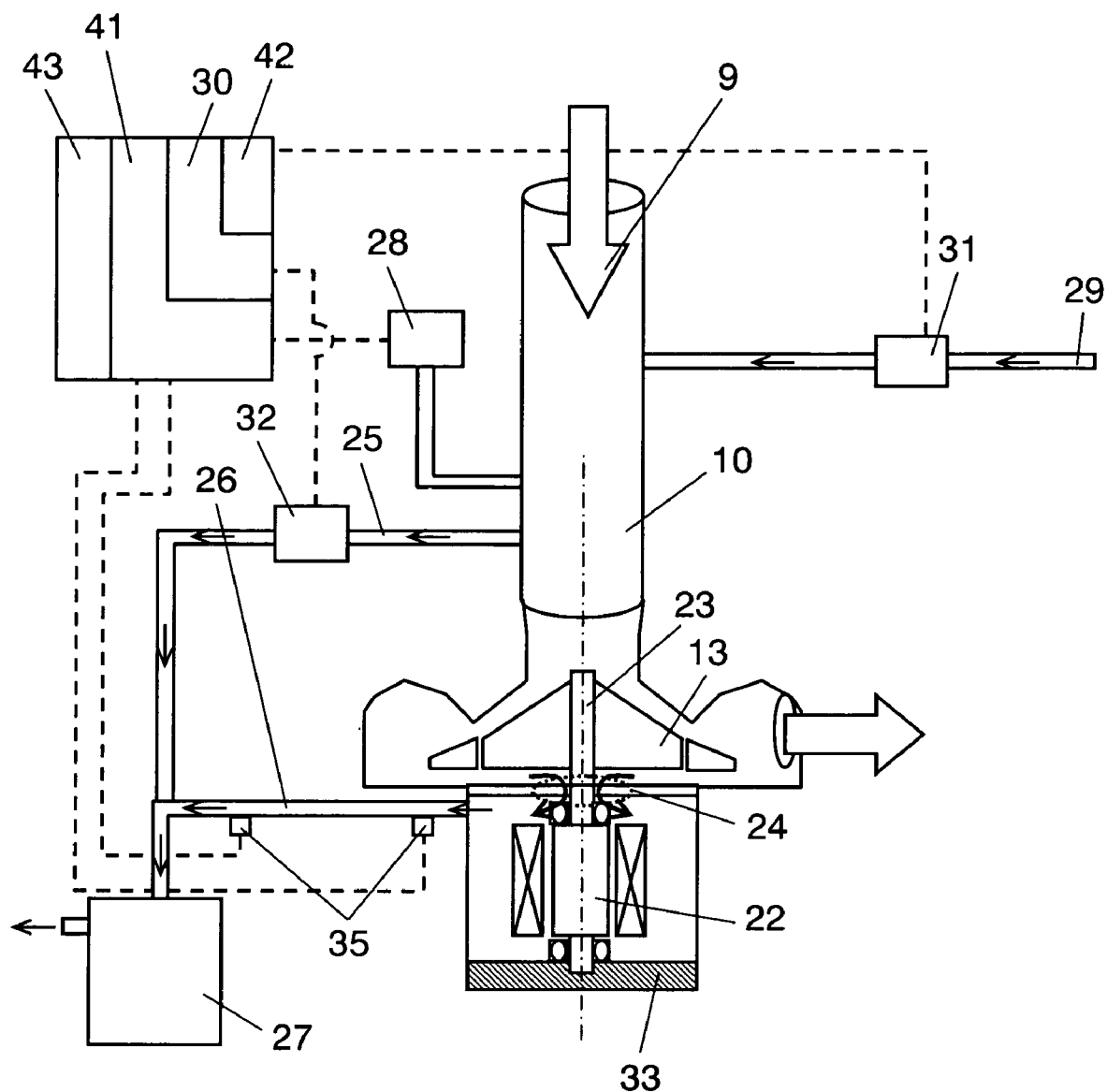
FIG. 4 is a structural diagram of a main part of a gas laser oscillator according to yet still other exemplary embodiment of the present invention.

As other method of this invention of indirectly detecting the ejected amount of gas from vacuum pump 27, an opening and closing cycle of the supply valve can be utilized as illustrated in FIG. 1. As still other method, flow amount sensor 34 a detector can be installed in a downstream of a junction between the main ejection apparatus and the sub ejection apparatus, as is illustrated in FIG. 2. Flow amount sensor 34 can also be installed halfway of the sub ejection apparatus, as is illustrated in FIG. 3. Otherwise, pressure detect port 35 a detector can be installed in two places of the sub ejection apparatus for measuring a difference of pressure between the two, thus detecting a flow amount of ejecting gas, as is illustrated in FIG. 4.

In the invention, alarm generated by alarm part 43 is not limited to any specific kind, but such as sound, light, letter display, letter printing, vibration, output of information to other devices are allowed.

INDUSTRIAL APPLICABILITY

The invention provides a gas laser oscillator equipped with an air blower, the laser oscillator which particularly has high reliability and which can be used stably for a long period of time, so the invention is industrially useful.

The invention claimed is:
1. A gas laser oscillator comprising:
a discharge part for exciting laser gas;
an air blower for blowing the laser gas;
a laser gas flow pipe constituting a circulation route of laser gas between the discharge part and the air blower;
a driving part for driving the air blower;
a divide wall separating the air blower and the driving part;

a gas supply apparatus having at least one valve, and supplying laser gas to the laser gas flow pipe;

a main ejection apparatus having at least one valve and ejecting laser gas out from the laser gas flow pipe;

a sub ejection apparatus having a pipe ejecting the laser gas from the driving part of the air blower;

a detector for detecting an amount of laser gas flowing through the laser gas flow pipe;

a controller controlling each valve of the gas supply apparatus and the main ejection apparatus; and a clogged laying pipe judge part judging the pipe of the sub ejection apparatus to be clogged when the detected amount of the laser gas is smaller than a predetermined value, wherein a signal from the detector is input to the controller; and wherein the controller compares the amount of the laser gas which is detected at a time the valve of the main ejection apparatus is closed, with a predetermined value.

2. The gas laser oscillator according to claim 1, further comprising an opening and closing cycle detector for detecting an opening and closing cycle of the valves of the gas supply apparatus when the valve of the main ejection apparatus is closed, wherein the clogged laying pipe judge part judging the pipe of the sub ejection apparatus is clogged when the detected opening and closing cycle is longer than a predetermined value.

3. The gas laser oscillator according to claim 1, further comprising an alarm part generating an alarm when the clogged laying pipe judge part judges the pipe of the sub ejection apparatus is clogged.

* * * * *

UNITED STATES PATENT AND TRADEMARK OFFICE
CERTIFICATE OF CORRECTION

PATENT NO.        : 7,580,439 B2
APPLICATION NO.   : 10/576688
DATED             : August 25, 2009
INVENTOR(S)       : Hiroyuki Hayashikawa et al.

Page 1 of 1

It is certified that error appears in the above-identified patent and that said Letters Patent is hereby corrected as shown below:

ON THE TITLE PAGE:

In Item "(56) References Cited", below the data listed under "FOREIGN PATENT DOCUMENTS" and before the Examiner Information, insert the following:

--OTHER PUBLICATIONS

Supplementary European Search Report, 6 pages--.

Signed and Sealed this

Twenty-ninth Day of December, 2009

David J. Kappos
*Director of the United States Patent and Trademark Office*